US 6,644,901 B2
Nov. 11, 2003

(12) United States Patent
Breckel

(54) CARGO TIE-DOWNS AND RAIL SYSTEMS INCLUDING SUCH TIE-DOWNS

(75) Inventor: Darrell L. Breckel, Corona, CA (US)

(73) Assignee: Sport Carriers, Inc., Corona, CA (US)

( * ) Notice: Subject to any disclaimer, the term of this patent is extended or adjusted under 35 U.S.C. 154(b) by 0 days.

(21) Appl. No.: 09/989,908

(22) Filed: Nov. 19, 2001

(65) Prior Publication Data

US 2003/0095846 A1 May 22, 2003

(51) Int. Cl.$^7$ ................................................. B60P 7/08
(52) U.S. Cl. ........................................ 410/104; 410/105
(58) Field of Search ............................ 410/74, 75, 101, 410/104, 105, 106, 107, 108, 109, 110, 111, 112, 113, 115, 116, 150

(56) References Cited

U.S. PATENT DOCUMENTS

| | | | | |
|---|---|---|---|---|
| 2,688,289 A | * | 9/1954 | Sterling | 410/104 |
| 3,241,501 A | * | 3/1966 | Watts | 410/105 |
| 3,351,356 A | * | 11/1967 | Clark et al. | 410/110 |
| 3,917,338 A | * | 11/1975 | Becker | 410/116 |
| 3,972,500 A | * | 8/1976 | Johnson et al. | 410/85 |
| 4,020,770 A | | 5/1977 | McLennan et al. | 105/482 |
| 4,085,684 A | | 4/1978 | McLennan et al. | 105/482 |
| 4,230,432 A | | 10/1980 | Howell | 410/102 |
| 4,256,424 A | | 3/1981 | Knox et al. | 410/105 |
| 4,270,681 A | * | 6/1981 | Ingram | 224/321 |
| 4,297,963 A | * | 11/1981 | Beacom | 114/230.29 |
| 4,493,470 A | | 1/1985 | Engel | 248/503.1 |
| 4,850,769 A | | 7/1989 | Matthews | 410/105 |
| 4,872,719 A | * | 10/1989 | Cardwell | 296/34 |
| 5,076,745 A | * | 12/1991 | Klein | 410/94 |
| 5,139,375 A | | 8/1992 | Franchuk | 410/105 |
| 5,259,711 A | | 11/1993 | Beck | 410/104 |
| 5,409,335 A | | 4/1995 | Beck | 410/105 |
| 5,494,388 A | | 2/1996 | Stevens | 410/112 |
| 5,533,848 A | * | 7/1996 | Davis | 410/105 |
| 5,733,082 A | | 3/1998 | Schrader | 410/115 |
| 5,738,471 A | | 4/1998 | Zenter et al. | 410/110 |
| 5,752,791 A | | 5/1998 | Ehrlich | 410/101 |
| 5,765,978 A | | 6/1998 | Looker et al. | 410/105 |
| 5,871,318 A | | 2/1999 | Dixon et al. | 410/105 |
| 2002/0048495 A1 | * | 4/2002 | Anderson et al. | 410/104 |

FOREIGN PATENT DOCUMENTS

FR 2675442 * 10/1992 ................. 410/104

OTHER PUBLICATIONS

Spot Carriers, Inc., "GMT 305 Upper and Lower Rail ASM, Initial Estimate Bid". Nov. 13, 2000.

* cited by examiner

*Primary Examiner*—Joseph D. Pape
*Assistant Examiner*—Paul Chenevert
(74) *Attorney, Agent, or Firm*—Cohen & Sakaguchi LLP; William A. English

(57) ABSTRACT

A cargo tie-down includes an enlarged head on a first end of a shaft a ring, and a "T" shaped foot on a second end of the shaft. A housing is slidably mounted to the shaft that is biased to move away from the head for engaging a rail between the housing and the foot. A track includes a pair of rails defining a slot extending along a longitudinal axis, and spaced-apart notches within the slot. The foot is inserted into the slot with the foot parallel to the longitudinal axis, the head is depressed, the tie-down is rotated until the foot is oriented transversely to the longitudinal axis, and the head is released. The tie-down is slid along the rail member until the foot is received in notches, thereby securing the tie-down to the rail member.

39 Claims, 8 Drawing Sheets

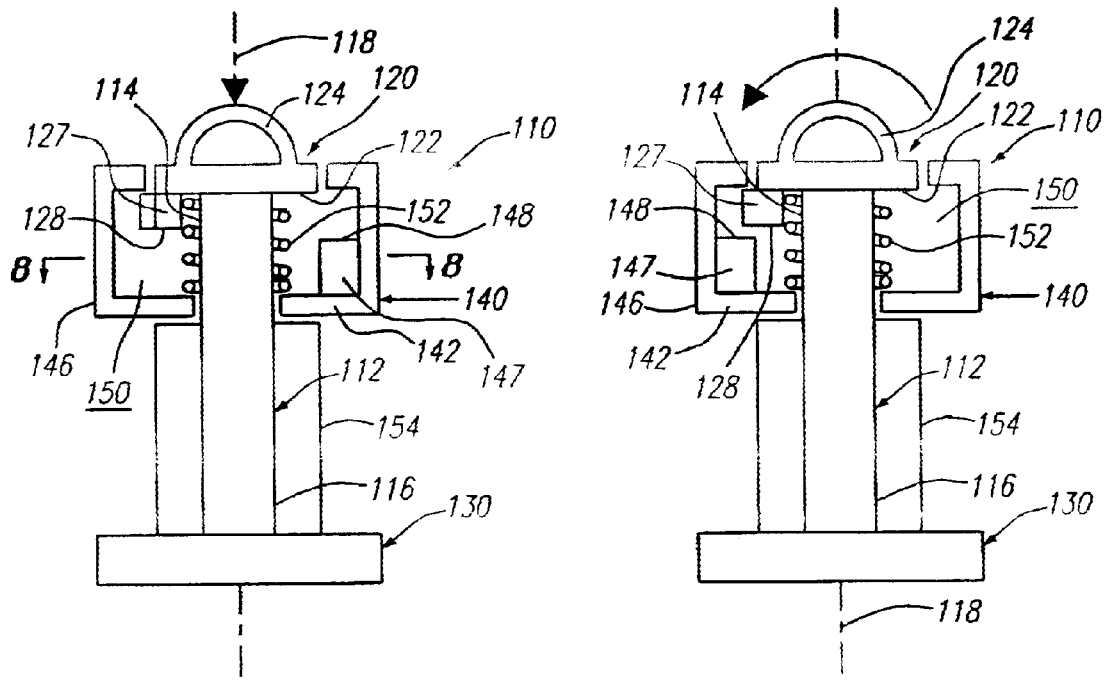
FIG. 7A  FIG. 7B
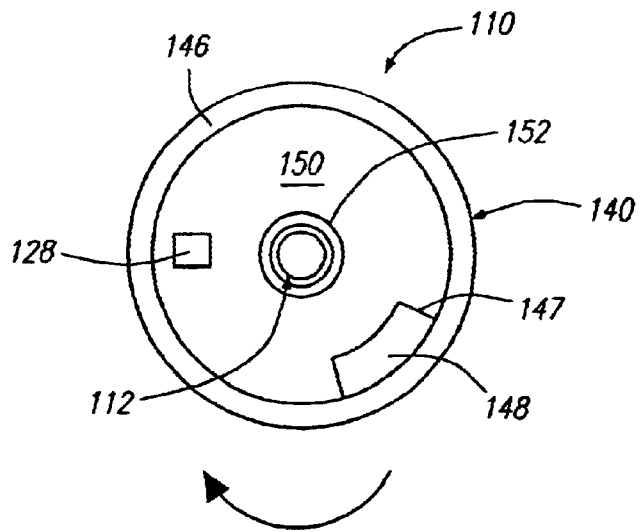
FIG. 8

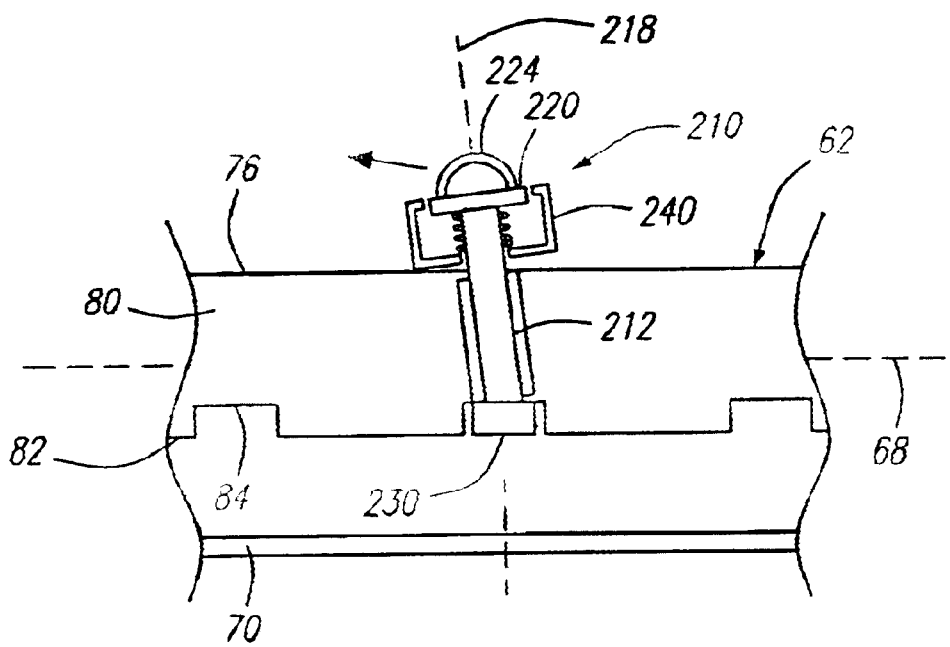
FIG. 10
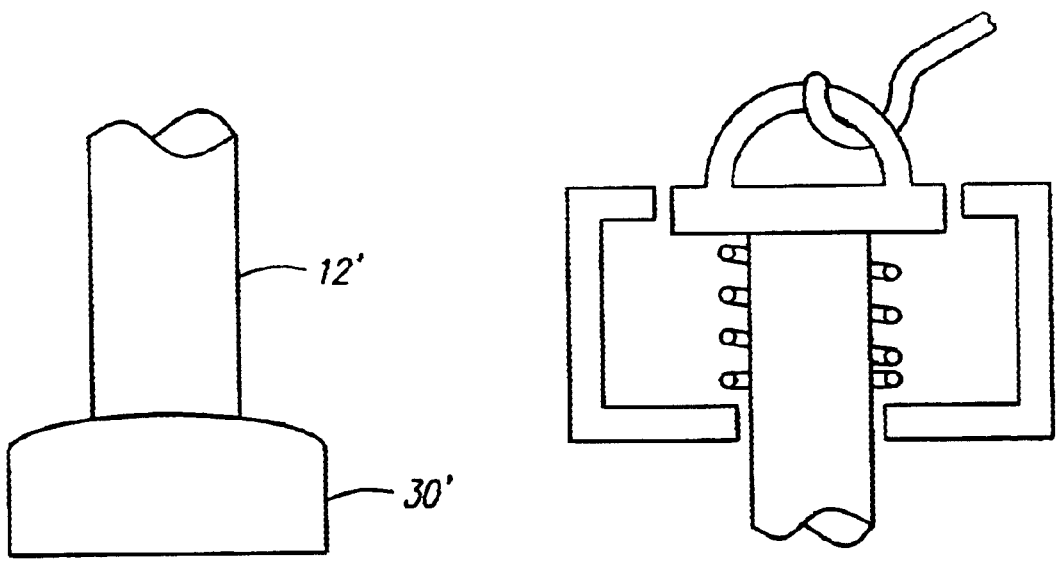
FIG. 11
FIG. 12

CARGO TIE-DOWNS AND RAIL SYSTEMS INCLUDING SUCH TIE-DOWNS

FIELD OF THE INVENTION

The present invention relates generally to apparatus and methods for securing items using rail systems, e.g., cargo within a vehicle, and more particularly to a tie-down receivable in a rail or track mounted to a bed or load deck of a vehicle, such as a pickup truck or sports utility vehicle, for securing cargo within the bed or load deck.

BACKGROUND

Vehicles are often used to carry cargo, for example, in a bed or load deck of a pickup truck or sport utility vehicle. To secure cargo to the load deck, tie-downs have been suggested that may be mounted to a floor and/or side walls of the load deck. Cables or straps may be wrapped around or otherwise engaged with the cargo to limit movement of the cargo within the load deck, and ends of the cables or straps secured to one or more tie-downs. The tie-downs may be mounted directly to the floor and/or side walls, or may be received in one or more tracks that may be mounted to the load deck.

For example, U.S. Pat. Nos. 4,020,770, 4,850,769, 5,259,711, 5,765,978, and 5,871,318 disclose track systems that include a tie-down or car that is slidable along a track. The track, which includes a slot extending between ends of the track, is mounted to a vehicle, e.g., to a side wall or floor of the vehicle. Generally, the car includes a ring or hook, thereby providing a tie-down for receiving a cable or strap. The car may be slid along the track to a desired location, and then the car may be secured to the track at the desired location.

One disadvantage of such systems is that the cars may not be easily removed from the tracks. For example, U.S. Pat. No. 5,259,711 discloses a car that includes a base portion that is inserted into a slot of the track from one end. Because the base portion is wider than the top of the slot, the car cannot be removed from the track unless the car is slid to one end, which may require removing an end cap covering the end of the track. Alternatively, U.S. Pat. No. 5,871,318 discloses a track that includes a plurality of enlarged openings spaced apart along the track that allow the car to be removed when aligned with the enlarged openings. This arrangement, however, may risk the car being removed from the track if the car becomes loose and slides into alignment with a set of the enlarged openings.

In addition, the cars for track systems may include mechanical latches for securing the cars at desired location along a track. U.S. Pat. No. 5,871,318, for example, discloses a car that includes locking discs that may be tightened to engage the track by rotating a plunger coupled to the discs. Such latches, however, may become loose, possibly allowing the cargo to shift, and/or allowing the car to vibrate and/or generate undesired noise. Further, latch mechanisms may require tools or special handling, thereby complicating adjusting and/or securing the car to the track.

Accordingly, tie-downs and track systems for securing cargo to vehicles would be considered useful.

SUMMARY OF THE INVENTION

The present invention is directed to apparatus and methods for securing cargo to a vehicle, and more particularly to tie-downs or sliders receivable in rails or tracks mounted to a bed, load deck, or other storage area of a vehicle, such as a pickup, sport utility vehicle, or other truck, for securing cargo within the storage area.

In accordance with one aspect of the present invention, a device is provided that includes a shaft including first and second ends defining an axis, a head on the first end of the shaft, and a foot on the second end of the shaft. A hook, ring, or other cargo securing element may be provided on the head of the shaft. In one embodiment, the foot may be "T" shaped, thereby defining a pair of opposing toes extending away from one another transversely to the axis. The foot may have a variety of cross-sectional geometries, e.g., such that the toes define a flat upper surface, a pointed or otherwise convex upper surface, and the like. Preferably, the foot has a width that is no larger than a cross-section of the spacer. In one embodiment, the foot may be pivotable about an axis that is transverse to the axis defined by the shaft.

A plate may be slidably mounted to the shaft between the first and second ends that is biased to move away from the head for engaging a portion of a rail between the plate and the foot. For example, a spring element, such as a compression spring, may be coupled between the plate and the head portion for biasing the plate towards the foot. In an alternative embodiment, the plate may be biased to move away from the foot and towards the head, e.g., by a compression spring coupled between the plate and the foot or an extension spring coupled between the plate and the head.

The plate may include one or more side walls extending towards the head portion of the shaft, thereby defining a housing including a cavity for receiving the spring element therein. Optionally, the device may include a spacer, e.g., a tubular spacer received over the shaft, for maintaining a minimal spacing between the plate and the foot.

In accordance with another aspect of the present invention, a system is provided for securing cargo within a storage space that includes one or more tie-downs, such as the device described above, and a rail member. The rail member may include a pair of rails defining a slot therebetween extending along a longitudinal axis. In a preferred embodiment, the rail member includes a base portion from which the pair of rails extend, thereby defining a channel. Flanges may extend from ends of the rails into the channel towards the base portion, thereby further defining the slot. The rail member may include a plurality of notches or pockets within the slot that are spaced apart along the rail member. In a preferred embodiment, the notches are provided in opposing pairs along the lower edges of the flanges.

The tie-down may include a shaft including first and second ends defining a transverse axis therebetween, a head on the first end, and a foot on the second end. A plate or housing may be slidably mounted to the shaft between the first and second ends that is biased to move away from the head and towards the foot. Preferably, the foot has a width that is smaller than a width of the slot in the rail member, and a length that is longer than the width of the slot.

The foot of the tie-down may be inserted into the slot such that the shaft and the transverse axis are transverse to the longitudinal axis and the foot is oriented substantially parallel to the longitudinal axis. As the foot is inserted into the slot, the plate or housing may contact upper edges of the rails. The head may be depressed, e.g., pushed into the housing, until the foot is disposed below lower edges of the flanges of the rail member. The tie-down may then be rotated about the transverse axis until the foot is oriented transversely to the longitudinal axis.

The foot may be aligned with a set of notches within the slot, and the head may be released, whereupon the foot may automatically be pulled into the notches due to the bias of the plate or housing. Alternatively, the head may be released, and the tie-down may be slid along the rail member until the foot encounters a set of notches, whereupon the foot may enter the notches. With the foot received in a set of notches, the rails may be engaged between the foot and the plate or housing, thereby substantially securing the tie-down relative to the rail member.

Preferably, the foot and the notches have complementary geometries such that the foot may be securely received in the notches. For example, the foot may have a rectangular, triangular, or at least partially cylindrical cross-section, thereby defining an upper surface that may be flat, or pointed, or otherwise generally convex. The plurality of notches may be a continuous pattern of undulations that extend along the rail member such that the foot may be received at any location along the rail member. Because of the bias of the tie-down, undulating notches may allow the foot to slide into the nearest notch when released.

With the tie-down secured, a cargo securing element may be secured to the head of the tie-down. For example, the head may include a hook or a ring, and a complementary cargo securing element, e.g., a hook, a strap, a cable, a cargo net, and the like, may be engaged with or received through the hook or ring.

To move the tie-down to a new location, the head may be depressed or pushed towards the rails for disengaging the foot from the notches, the tie-down may be slid along the rail member to a new location, and then the tie-down may be released, whereupon due to the spring bias, the foot may be automatically received in another set of notches in the rail member, thereby substantially securing the tie-down at the new location. Preferably, the head may be released before reaching the new location such that, as the foot approaches the new location, the foot may be biased to enter a set of notches at the new location.

To remove the tie-down from the rail member, the head portion may be depressed or pushed towards the rails for disengaging the foot from the notches. The tie-down may be rotated about the transverse axis until the foot is oriented substantially parallel to the longitudinal axis, and then the foot may then be removed from within the slot until the tie-down is released from the rail member.

Thus, a tie-down in accordance with the present invention may be biased to automatically secure the tie-down to a rail member. As the tie-down is slid to a desired location along a rail member, the foot may automatically engage an available set of notches, thereby eliminating the need to visually confirm the location of the notches before securing the tie-down. In addition, because of the spring bias, the tie-down may be substantially securely engaged with the rail member, thereby reducing rattling or other undesired noise. Further, because the tie-down may be rotated relative to the rail member, the tie-down may be easily removed from any location along the rail member, thereby eliminating the need to slide the tie-down to one end of the rail member.

Other objects and features of the present invention will become apparent from consideration of the following description taken in conjunction with the accompanying drawings.

BRIEF DESCRIPTION OF THE DRAWINGS

FIGS. 7A and 7B are cross-sectional views of another preferred embodiment of a tie-down, in accordance with the present invention.

FIG. 8 is a cross-sectional view of the tie-down of FIGS. 7A and 7B, taken along line 8—8.

FIG. 10 is a longitudinal cross-sectional view of rail member, including the tie-down of FIGS. 9A and 9B secured to the rail member.

FIG. 11 is a detail, showing an alternative embodiment of a foot for the tie-down shown in FIGS. 1–5.

FIG. 12 is a detail, showing a cargo-securing element, ie., a hook, inserted through the tie-down shown in FIG. 2.

DETAILED DESCRIPTION OF THE PREFERRED EMBODIMENTS

Figure 1:
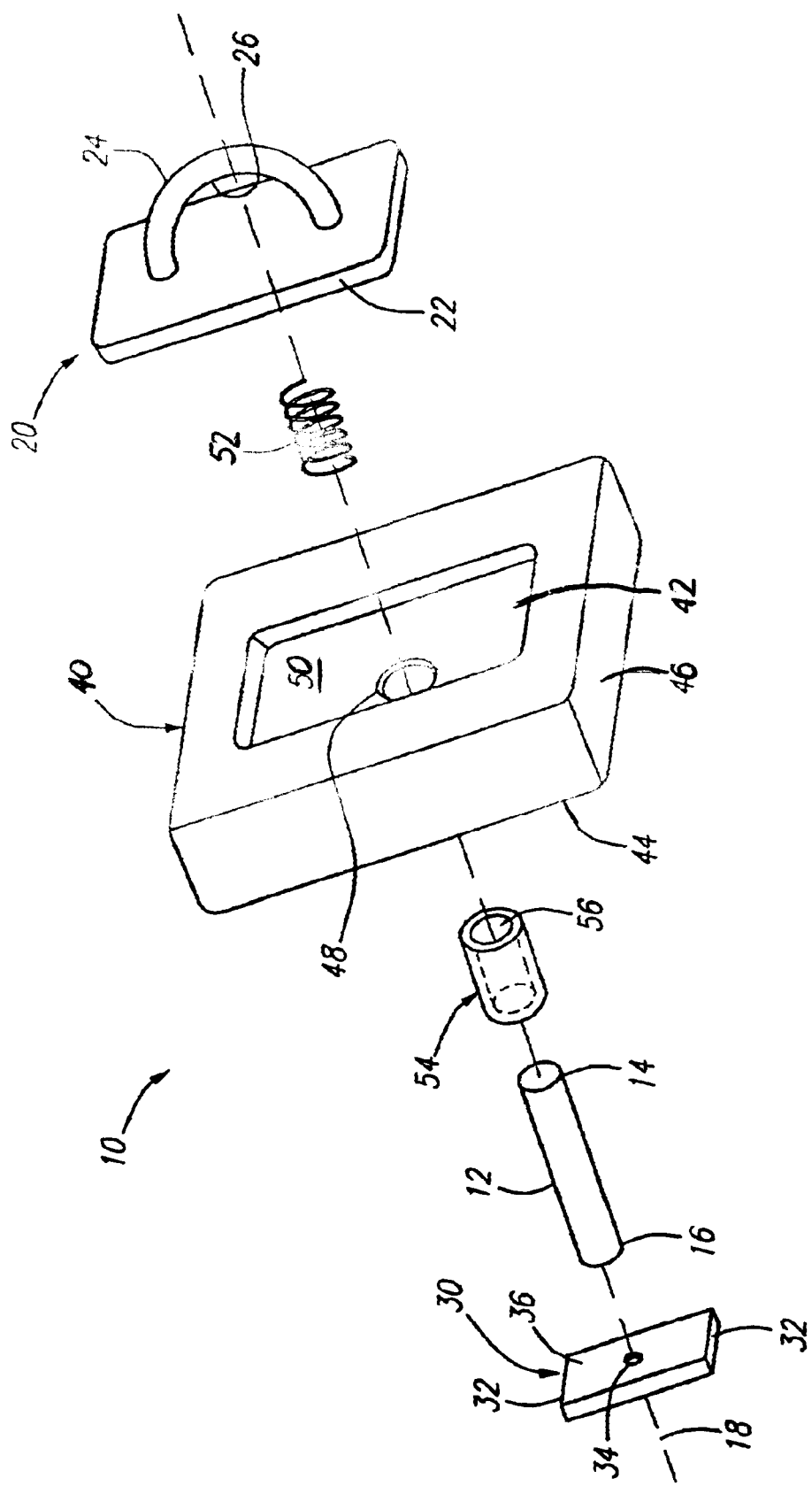
FIG. 1 is an exploded perspective view of a first preferred embodiment of a tie-down, in accordance with the present invention.
Figure 2:
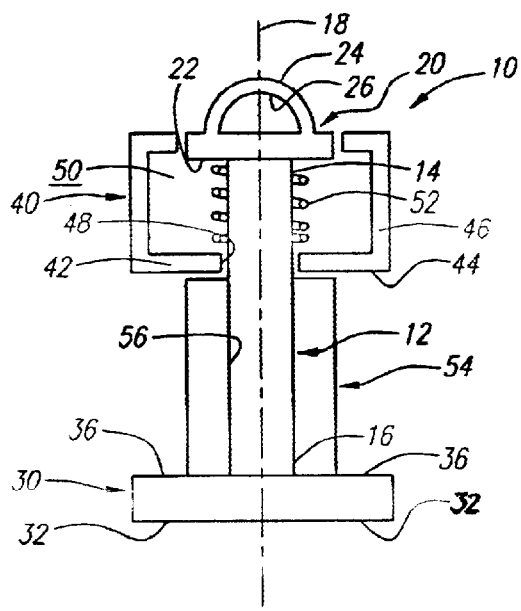
FIG. 2 is a cross-sectional view of the tie-down of FIG. 1.

Turning to the drawings, FIGS. 1 and 2 show a preferred embodiment of a tie-down 10, in accordance with the present invention. Generally, the tie-down 10 includes a shaft 12 and a housing 40 slidably mounted to the shaft 12. The shaft 12 includes a first end 14 and a second end 16 defining an axis 18 therebetween, and may have one of a variety of cross-sections, e.g., rectangular, although preferably the cross-section is generally symmetrical about the axis 18, e.g., round or square.

An enlarged head portion 20 is provided on the first end 14 of the shaft 12, which may have a shape that is larger than the shaft 12, e.g., a rectangular, square, or round shape, thereby defining a lower surface 22. Preferably, the head portion 20 includes a cargo securing element thereon, such as a ring 24, which may be round or flat, e.g., defining a round or elongate slot 26. Alternatively, the cargo securing element may be a hook or other connector (not shown) for receiving and/or engaging a complementary cargo securing element, as described further below.

Figure 9A:
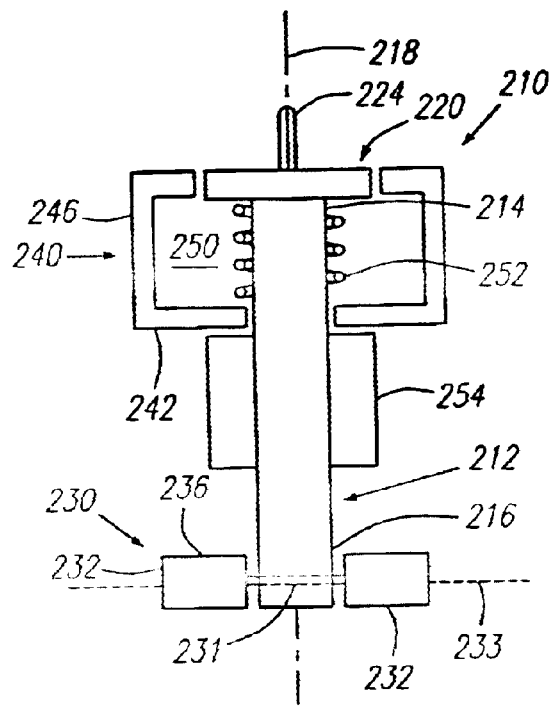
FIGS. 9A and 9B are side views of yet another preferred embodiment of a tie-down, in accordance with the present invention.
Figure 9B:
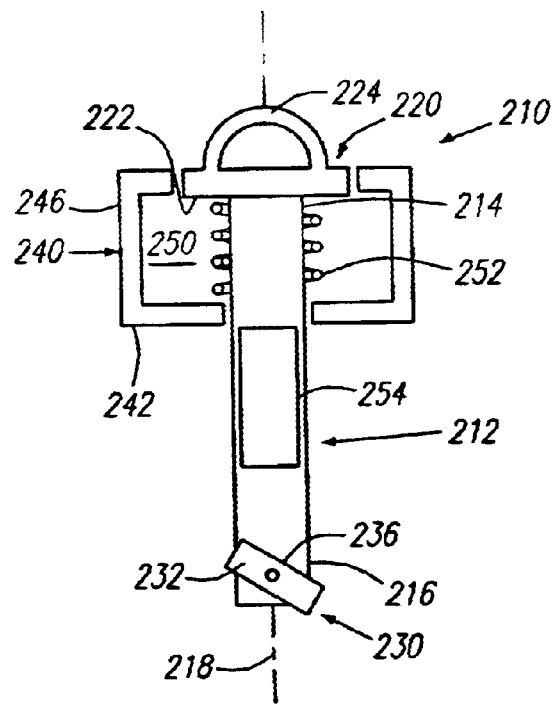

A foot 30 is provided on the second end 16 of the shaft 12, e.g., including one or more toes 32 extending transversely with respect to the axis 18. Preferably, the foot 30 includes a pair of opposing toes 32, thereby generally defining a "T" shape. In a preferred embodiment, the foot 30 is substantially fixed relative to the shaft 12, e.g. such that the foot 30 extends substantially perpendicularly to the axis 18 and the toes 32 define upper surfaces 36 that are disposed towards the first end 14 of the shaft 12. Alternatively, as shown in FIGS. 9A and 9B, a foot 230 may be provided that is pivotally attached to a shaft 212 such that the foot 230 may pivot about an axis 233 that is transverse, and preferably substantially perpendicular, to the axis 218, thereby allowing upper surfaces 236 of the foot 230 to define an angle with the axis 218, as explained further below.

The foot 30 may have a variety of geometric cross-sections, e.g., rectangular, as shown, or alternatively triangular, cylindrical, or otherwise generally convex, as shown in FIG. 11. Thus, the upper surfaces 236 may be flat, as shown, or alternatively, may be inclined, pointed, or otherwise generally convex (not shown).

Returning to FIGS. 1 and 2, the housing 40 is slidably mounted to the shaft 12 between the first and second ends 14, 16. The housing 40 includes a base plate 42 defining a lower surface 44, and may include one or more side walls 46 extending from the base plate 42 towards the head portion 20 of the shaft 12, thereby defining a cavity 50. Preferably, the cavity 50 is sufficiently large such that the head portion 20 may be at least partially received in the cavity 50, as described further below. An opening 48 is provided in the base plate 42 for receiving the first end 14 of the shaft 12 therethrough, as best seen in FIG. 2.

A spring 52 is disposed within the cavity 50 and coupled between the housing 40 and the head portion 20 for biasing the housing 40 away from the head portion 20. In a preferred embodiment, the spring 52 is a compression spring that is disposed concentrically around the shaft 12, as best seen in FIG. 2. The spring 52 may engage the base plate 42 and the lower surface 22 of the head portion 20 when a force is applied to move the head portion 20 and the base plate 42 towards one another, thereby biasing the housing 40 and the head portion 20 to move away from one another when the force is removed, as described further below.

A spacer 54 may be provided between the foot 30 and the housing 40 for maintaining a minimal spacing therebetween. In one embodiment, the spacer 54 is a tubular member defining a passage 56 for receiving the shaft 12 therethrough. The spacer 54 may have a predetermined length, thereby preventing the housing 40 from being pushed by the spring 52 along the shaft 12 until the lower surface 44 of the base plate 42 abuts the upper surface 36 of the foot 30. Alternatively, instead of the spacer 54, the shaft 12 may include a wide portion (not shown, see FIGS. 9A and 9B) adjacent the second end 16 against which the base plate 42 may engage to prevent the housing 40 from moving against the foot 30. For example, such an integral spacer may simply be one or more tabs (as shown in FIGS. 9A and 9B) or an annular ridge (not shown) extending from a predetermined location of the shaft 12 corresponding to the desired minimal spacing. In a further alternative, the spacer 54 may be eliminated, allowing the housing 40 to move along the shaft 12 until the lower surface 44 of the base plate 42 abuts the upper surface 36 of the foot 30.

In an alternative embodiment, the housing 40 may include a lower portion (not shown) extending from the base plate 42 towards the foot 30. The lower portion may have a cross-section similar to the cross-section of the spacer 54. The spring 52 may be received in the lower portion of the housing 40, which may reduce an overall height or profile of the housing 40. The head portion 20 may include a tab or annular ridge that overlies and/or extends towards the lower portion such that the spring 52 may be coupled between the lower portion and the tab or annular ridge.

The shaft 12, head portion 20, and foot 30 may be separate components, as shown in FIG. 1, that are attached to one another. Each component may be formed from a variety of known materials, e.g., metal, such as steel or aluminum, plastic or composite material, or a combination of such materials. The components may be machined, cast, molded, and the like. After fabricating the components, they may be assembled together using fasteners, welding, soldering, adhesives, and the like.

For example, the foot 30 may be a transverse member or plate that may be secured to the second end 16 of the shaft 12 using a screw (not shown) that may be received axially through an opening 34 in the foot 30 and into the second end 16 of the shaft 12. Alternatively, the foot 30 may include a pair of toes (not shown) attached to the second end 16 of the shaft 12 such that the toes extend away from one another substantially perpendicularly to the axis 18. In a preferred embodiment, the foot 30 has a width that is no larger than a cross-section of the spacer 54 (or the shaft 12 if the spacer is not included).

To assemble the tie-down 10, the foot 30 may be attached to the second end 16 of the shaft 12, if the foot 30 is a separate component. Sequentially, the spacer 54, housing 40, and spring 52 may then be received over the shaft 12, e.g., by inserting the first end 14 of the shaft 12 through the passage 56 in the spacer 54, through the opening 48 in the housing 40, and through the spring 52. The head portion 20 may then be attached to the first end 14 of the shaft 12, e.g., by a fastener, such as a screw (not shown) received through the head portion 20 and into the first end 14 of the shaft 12. Alternatively, if the head portion 20 is formed as part of the shaft 12, the spring 52, housing 40, and spacer 54 may be received sequentially over the second end 16 of the shaft 12, and then the foot 30 may be attached to the second end 16.

In a further alternative, if the shaft 12, head portion 20, and foot 30 are formed as a single part (not shown), the housing 40 may be provided as multiple parts, e.g., in halves (also not shown), that may be received around the shaft 12 and attached to one another. In this latter alternative, the spring may not be a concentric spring but may include one or more springs coupled between the housing 40 and the head portion 20 after the housing 40 is assembled (not shown).

Figure 3:
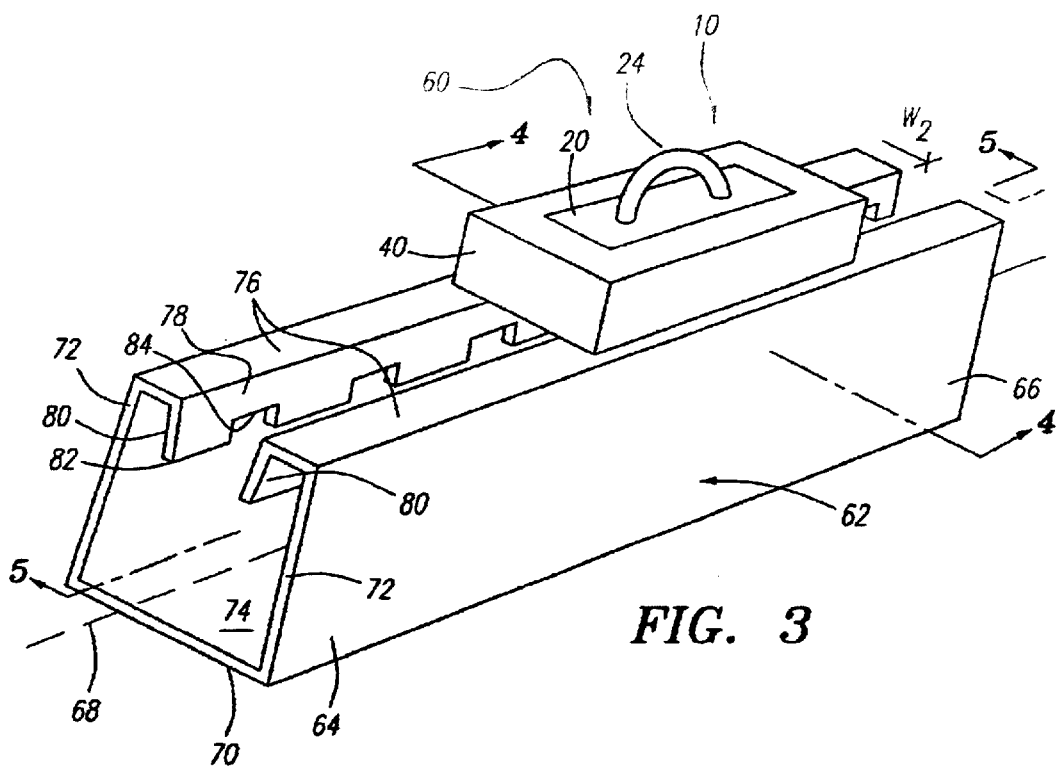
FIG. 3 is a perspective view of a system for securing cargo, including the tie-down of FIG. 1 and a rail member for receiving the tie-down, in accordance with the present invention.
Figure 4:
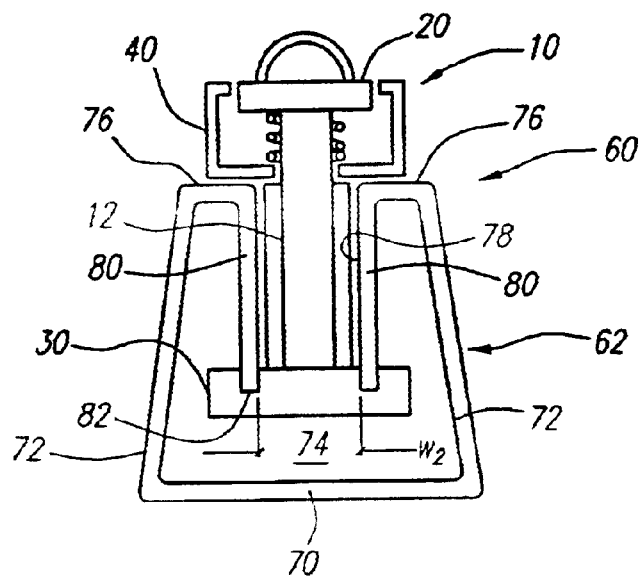
FIG. 4 is a cross-sectional view of the tie-down and rail member of FIG. 3, taken along line 4—4.
Figure 5:
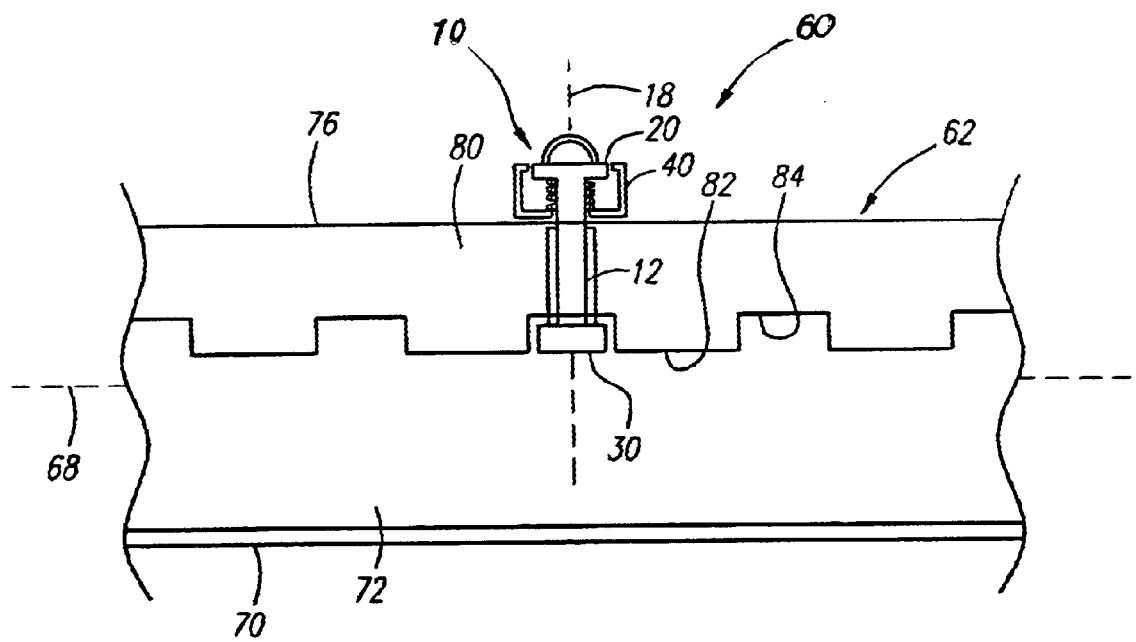
FIG. 5 is a longitudinal cross-sectional view of the tie-down and rail member of FIG. 3, taken along line 5—5.

Turning to FIGS. 3–5, a preferred embodiment of a system 60 for securing cargo (not shown) generally includes a rail member 62 and one or more tie-downs, such as the tie-down 10 described above. Generally, the rail member 62 is an elongate, preferably substantially straight, member defining a longitudinal axis 68 between its first and second ends 64, 66. As best seen in FIG. 4, the rail member 60 may have a generally "U" or "C" shaped cross-section including a base portion 70 from which a pair of rails 72 extend transversely to define a channel 74. The rails 72 include upper edges or shoulders 76 opposite the base portion 70 that define a slot 78 therebetween that communicates with the channel 74. In a preferred embodiment, the slot 78 may extend continuously between the ends 64, 66 of the rail member 62, although alternatively, the slot 78 may extend only partially between the ends 64,66, and/or the slot 78 may be intermittent, i.e., thereby providing a plurality of separate slot segments (not shown).

The rails 72 may extend from the base portion 70 towards one another, thereby defining a generally acute internal angle between the base portion 70 and the rails 72. The acute angles may facilitate slidably receiving the tie-down 10 in the slot 78 with enhanced stability and/or may enhance a rigidity of the rail member 62. Alternatively, one or both rails 72 may extend substantially perpendicularly to or at an obtuse angle (not shown) from the base portion 70. The rail member 62 is preferably formed as a single, continuous part, which may be formed from plastic material, such as nylon, ABS, or ASA, or from metal material, such as aluminum or steel. Any conventional manufacturing methods may be used to make the rail member 62, e.g., roll forming, extruding, molding, casting, machining, and the like. The specific material, shape, and/or angle of the rail member 62 may be selected based upon desired performance characteristics of the rail member 62, such as desired structural or aerodynamic characteristics, as will be appreciated by those skilled in the art.

At least one of the rails 72, and preferably each of the rails 72, includes a flange or hemmed portion 80 that extends from the shoulders 76 into the channel 74 towards the base portion 70. The shoulder 76 and flange 80 may together generally define an inverted "U" shape, as shown in FIG. 1. Alternatively, the flange 80 may generally define an "L" shape such that the flange 80 includes a leg (not shown) that extends from a lower edge 82 of the flange 80 substantially parallel to the base portion 70. In a further alternative, flanges may be provided that extend away from the slot 78 and/or along an outer surface of the rails 72 (not shown).

The lower edge 82 of one or both of the flanges 80 may include a plurality of recesses or notches 84 formed therein that are spaced apart along the longitudinal axis 68. In one embodiment, a substantially continuous pattern of rectangular or square notches 84 may extend along each of the flanges 80 between the first and second ends 64, 66 of the rail member 62, thereby providing a square wave pattern along the lower edges 82. Alternatively, the notches 84 may define a saw-tooth, wave, or other undulating pattern (not shown), such as that disclosed in co-pending application Ser. No. 09/713,760, filed Nov. 14, 2000. The disclosure of this application and any references cited therein are expressly incorporated herein by reference.

The pattern may have a substantially constant frequency or period, i.e., such that the spacing between adjacent notches 84 is substantially constant. Alternatively, the spacing between adjacent notches 84 may vary along the length of the rail member 62 (not shown) to provide a variable degree of positioning control at different locations along the rail member 62, if desired. In a further alternative, e.g., if the flanges 80 may be eliminated, and a plurality of recesses or pockets (not shown) may be provided in the rails 72 that are spaced apart similar to the notches 84.

The notches 84 may facilitate securing a tie-down 10 to the rail member 62. For example, the notches 84 may have a width "$w_1$" that is less than a width "f" of the foot 30 on the tie-down 10. Preferably, if the tie-down 10 includes opposing toes 32 (best seen in FIG. 4), the notches 84 are provided in sets such that the foot 30 may be disposed across the channel 74 with the toes 32 received in a set of notches 84. Preferably, the notches 84 have shapes that complement or match the shape of the foot 30, thereby enhancing the foot 30 being securely received within the notches 84, as described further below.

The system 60, i.e., tie-down 10 and rail member 62, may be used for securing cargo to a vehicle, e.g., within a storage space of the vehicle (not shown). Although the system 60 may be particularly useful for securing cargo within a bed or load deck of a pickup truck, sport utility vehicle, or other automobile, the system 60 may also be used in other vehicles as well, such as a trailers, rail car, aircraft, and the like. Alternatively, the system 60 may be used in any application in which a rail member may be secured to a surface and/or where a tie-down may be removably received within a slot or pocket. The rail member and tie-down may be provided separately, together as a kit, or already mounted to a surface.

Generally, the rail member 62, and preferably, a plurality of such rail members 62, may be mounted to one or more surfaces of the vehicle (not shown), such as a floor and/or side wall of a load deck. For example, the rail member 62 may include a plurality of apertures (not shown) in the base portion 70 for attaching the rail member 62 to a surface (not shown). A fastener, such as a screw, rivet, bolt, and the like (not shown), may be inserted through respective apertures in the rail member 62 to mount the rail member 62 substantially permanently to the surface. Alternatively or in addition, the rail member 62 may be bonded to the surface using an adhesive or other bonding material. In a further alternative, the rail member 62 may include feet or posts (not shown) at or near respective ends 64, 66 that may be mounted to the surface and/or may include external tabs (not shown) that may be received in slots or pockets in the floor and/or side wall instead of or in addition the fasteners described above.

A tie-down 10, and preferably a set of tie-downs (not shown), may be provided, each of which includes a shaft 12 including first and second ends 14, 16 defining a transverse axis 18, a head portion 20 on the first end 14, a foot 30 on the second end 16, and a plate or housing 40 slidably mounted to the shaft 12 between the first and second ends 14, 16 that is biased away from the head portion 20, as described above.

To facilitate use of the system, the tie-down 10 and the rail member 62 may have a number of predetermined dimensions relative to one another, as shown in FIGS. 6A–6D. For example, the shaft 12 of the tie-down 10 may have a length "l" (the distance between the first and second ends 14, 16) that is longer than a height "$h_1$" of the flanges 80 (the distance from the shoulders 76 to the lower edges 82). The notches 84 may have a height "$h_2$" (the distance from the shoulders 76 to the notches 84) that is less than the height "$h_1$." The foot 30 may have a width "f" that is smaller than a width "$w_2$" of the slot 78 (shown in FIGS. 3 and 4), and the foot 30 may have a length "F" that is longer than the width "$w_2$" of the slot 78. In addition, if the tie-down 10 includes a spacer 54, the spacer 54 may define a length "s" for maintaining a minimal spacing "s" between the housing 40 and the foot 30 that is equal to or less than the height "$h_2$." Further, a maximum cross-section of the spacer 54 (or of the shaft 12 if no spacer is provided) may be less than the width "$w_2$" of the slot 78, and preferably similar to the width "f" of the foot 30.

Figure 6A:
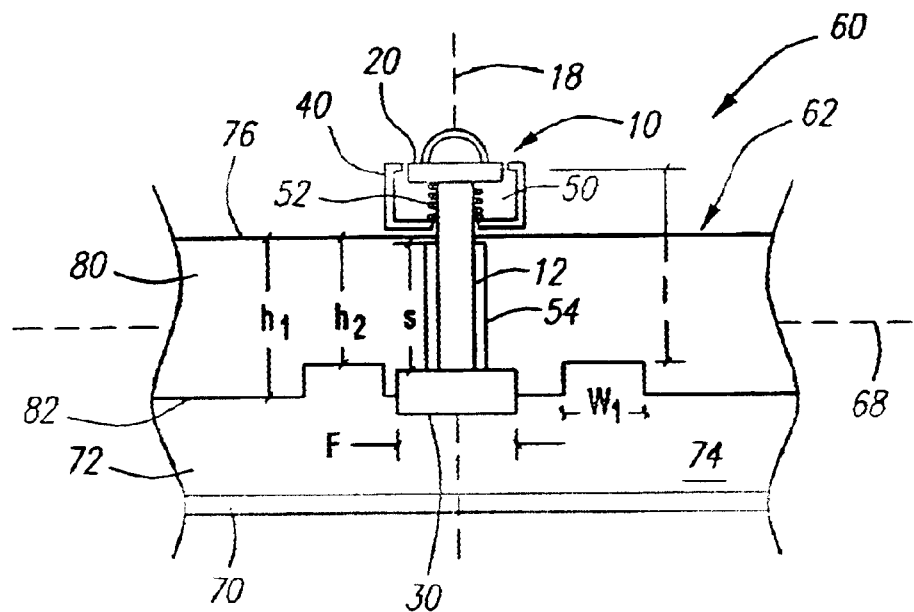
FIGS. 6A–6D are longitudinal cross-sectional views of a rail member, showing a method for securing a tie-down in a slot of the rail member.

Initially, as shown in FIG. 6A, the foot 30 (and spacer 54, if provided) of the tie-down 10 may be inserted into the slot 78 such that the shaft 12 (and consequently, the transverse axis 18) is oriented substantially perpendicular to the longitudinal axis 68. With the length "F" of the foot 30 oriented generally parallel to the longitudinal axis 68, the width "f" of the foot 30 (and the spacer 54) allows the foot 30 (and the spacer 54) to pass freely between the shoulders 76 and into the slot 78. Because the housing 40 has a width dimension (not shown) that is wider than the width "$w_2$" of the slot 78, the lower surface 44 of the housing 40 abuts the shoulders 76 of the rails 72, preventing the housing 40 from entering the slot 78.

Figure 6B:
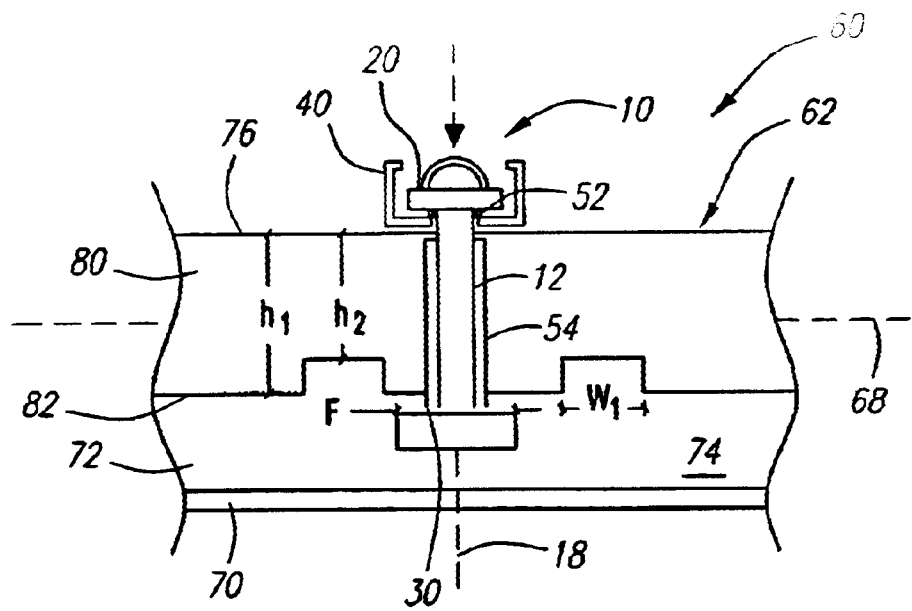

Turning to FIG. 6B, if a downward force (towards the base portion 70 of the rail member 62) is applied to the head portion 20, the bias of the spring 52 may be overcome to direct or depress the head portion 20 into the cavity 50 of the housing 40, while the housing 40 continues to abut the shoulders 76. Pushing the head portion 20 downwardly causes the shaft 12, and consequently the foot 30, to move downwardly towards the base portion 70 of the rail member 62 until the foot 30 is lower than the lower edges 82 of the flanges 80.

Figure 6C:
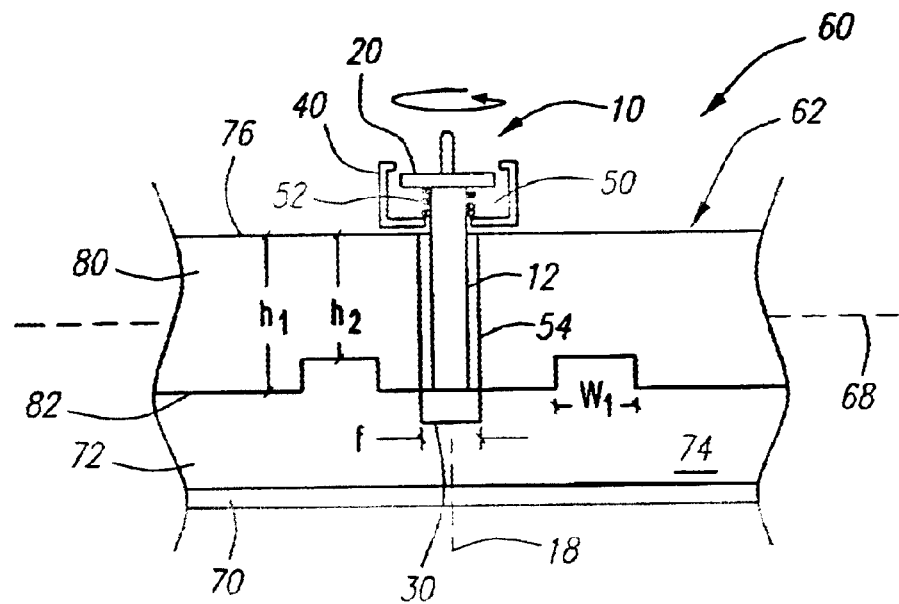

As shown in FIG. 6C, the tie-down 10 may then be rotated about the transverse axis 18 until the foot 30 is oriented transversely, and preferably substantially perpendicular, to the longitudinal axis 68. Because the length "F" of the foot 30 is longer than the width of the slot 78, the toes 32 of the foot 30 may extend beyond the lower edges 82 of the hemmed portions 80, as shown in FIG. 4.

Figure 6D:
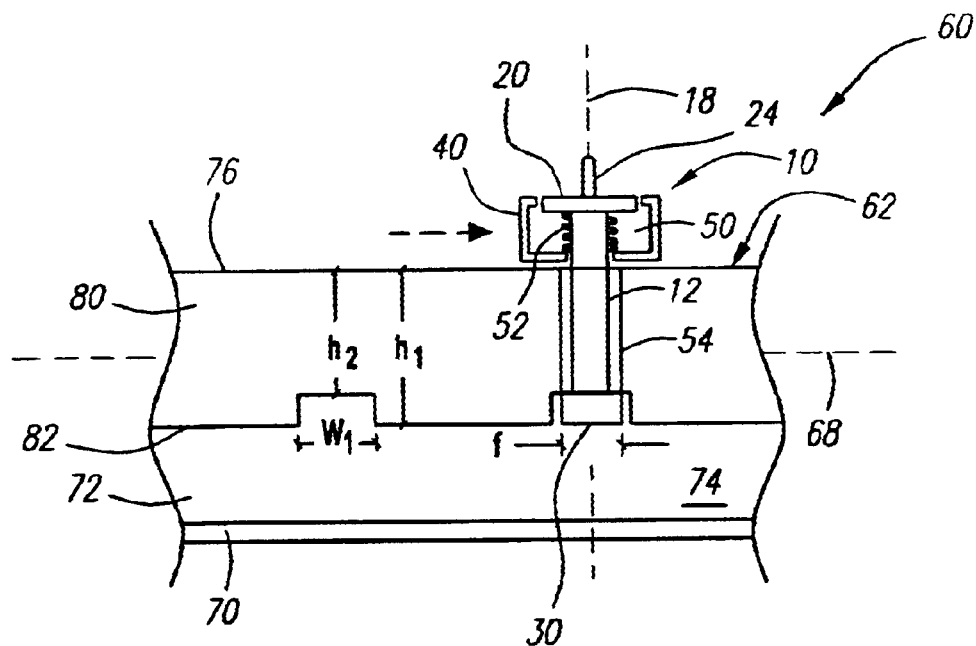

As shown in FIG. 6D, the tie-down 10 may then be slid along the rail member 62, causing the housing 40 to slide along the shoulders 76 and the foot 30 to slide along the lower edges 82. When the foot 30 reaches a notch 84, the foot 30 may automatically be pulled into the notches 84 because of the bias of the spring 52, thereby engaging the foot 30 in the notches 84 and substantially securing the tie-down 10 at the location.

Alternatively, with the head portion 20 depressed, the tie-down 10 may be slid along the rail member 62 until the foot 30 is aligned with a notch 84, whereupon, the head portion 20 may be released, causing the foot 30 to enter the notch 84, thereby substantially securing the tie-down 10 relative to the rail member 62. Optionally, as described above, the notches 84 may define a continuous pattern of undulations, e.g., a wave pattern or saw-tooth pattern, and the upper surface 36 of the foot 30 may have a complementary shape (not shown). This may allow the foot 36, upon release, to slide automatically into the nearest notch 84 due to the bias of the tie-down 10.

To move the tie-down 10 to another location (not shown), the head portion 20 may be depressed to disengage the foot 30, and the tie-down 10 may be slid along the rail member 62 to a new location. The head portion 20 may be released at the new location or shortly before reaching the new location such that the foot 30 slides along the lower edges 82 and is biased to be received in the next set of notches 84 encountered, thereby substantially securing the tie-down 10 at the new location. Once the tie-down 10 is secured at a desired location, a complementary cargo securing element, such as a rope, a cable strap, a chain, a hook (see FIG. 12), a net, and the like (not shown) may be inserted through the ring 24 or otherwise engaged with the tie-down 10.

One advantage of the tie-down 10 is that it may be easily removed from the rail member 62 at any location in the slot 78. To remove the tie-down 10, the head portion 20 may be depressed or pushed towards the rails 72 to disengage the foot 30 from the notches 84, and then the head portion 20 or the entire tie-down 10 may be rotated about the transverse axis 18 until the length "F" of the foot 30 is oriented substantially parallel to the longitudinal axis 68. The foot 30 may then be removed from within the slot 78, thereby releasing the tie-down 10.

Turning to FIGS. 7A, 7B, and 8, another preferred embodiment of a tie-down 110 is shown, in accordance with the present invention. Similar to the previous embodiment, the tie-down 110 generally includes a shaft 112 including first and second ends 114, 116 defining an axis 118. A head portion 120 is provided on the first end 114, and a foot 130 is provided on the second end 116. A housing 140 is slidably mounted to the shaft 112 between the first and second ends 114, 116 that is biased away from the head portion 120, e.g., by a spring 152 within a cavity 150 defined by the housing 140. In addition, the tie-down 110 may include a spacer 154 for maintaining a minimal spacing between the foot 130 and a base plate 142 of the housing 140, if desired.

Unlike the previous embodiment, the tie-down 110 includes cooperating first and second surfaces 128, 148 on the head portion 120 and the housing 140, preferably within the cavity 150, that may substantially engage one another when the housing 140 and head portion 120 are rotated relative to one another to a predetermined orientation for securing the head portion 120 from movement into the cavity 150, i.e., towards the base plate 142. In the exemplary embodiment shown, the head portion 120 may include a tab 127 extending from the lower surface 122 towards the base plate 142 that defines the first surface 128. The housing 140 may include a ridge 147 extending from a side wall 146 and/or the base plate 142 of the housing towards the head portion 120.

In a first orientation, shown in FIG. 7A, the head portion 120 may be depressed into the cavity 150 without any interference being caused by the tab 127 and/or the ridge 147. When the head portion 120 and housing 140 are rotated relative to one another about axis 118 to the orientation shown in FIG. 7B, the tab 127 may overlie the ridge 147 such that the surfaces 128, 148 may substantially engage one another if a downward force is applied to the head portion 120. Optionally, the head portion 120 and/or the housing 140 may include a position indicator (not shown) on an exterior surface that may provide a visual indication whether the tie-down 110 is in the free orientation of FIG. 7A or the locked orientation of FIG. 7B.

In addition, one of the surfaces 128, 148 may be ramped to facilitate rotating the tie-down 110 to the locked orientation. For example, if the head portion 120 is partially depressed, a ramped surface (not shown) may allow rotation of the housing 140, thereby causing the tab 127 to ride along a ramped ridge (not shown) until the head portion 120 is secured at the locked orientation. Alternatively or in addition, a stop (not shown) may be provided; the tie-down 110 may be rotated until the stop prevents further rotation and provides a tactile indication that the tie-down 110 is in one of the free and/or locked orientations. In a further alternative, a separate moveable component (not shown) may be provided, e.g., pivotally coupled to the housing 140, that may be moved to a position, e.g., into the housing 140, to prevent the head portion 120 from being depressed.

The tie-down 110 may be inserted and secured in a rail member (not shown), similar to the embodiment described above. Once the foot 130 is engaged within a set of notches (also not shown), however, the housing 140 may be rotated until the surfaces 128, 148 overlie or engage one another, thereby preventing the foot 130 from being dislodged inadvertently from the notches. If it is desired to move or remove the tie-down 110, the housing 140 may be rotated to the free orientation, and the head portion 120 may be depressed to release the foot 130. The tie-down 110 may then be slid to another location or rotated to remove it from the rail member.

Turning to FIGS. 9A, 9B, and 10, yet another embodiment of a tie-down 210 is shown that may enhance engagement of the tie-down 210 with a rail member (not shown). Generally, the tie-down 210 generally includes a shaft 212 including first and second ends 214, 216 defining an axis 218. A head portion 220 is provided on the first end 214 that includes a ring 224 or other cargo securing element, and a foot 230 is provided on the second end 216. A housing 240 is slidably mounted to the shaft 212 between the first and second ends 214, 216 that is biased away from the head portion 220, e.g., by a spring 252.

Optionally, the tie-down 210 may include a spacer 254 for maintaining a minimal spacing between the foot 230 and a base plate 242 of the housing 240, if desired. In this exemplary embodiment, the spacer 254 is a pair of tabs extending transversely from the shaft 212, although a tubular spacer (not shown) may also be used.

Unlike the previous embodiments, the foot 230 is pivotally mounted to the second end 216 of shaft 212. For example, opposing toes 232 may be connected to each other and pivotally connected to the shaft 212 by a pin 231. The pin 231 may define an axis 233 that extends transversely or substantially perpendicularly to the axis 218 and substantially parallel to the length of the foot 230.

As shown in FIG. 10, the pivoting or "rocking" foot 230 may enhance engagement between the foot 230 and a rail member 62. For example, when the foot 230 is engaged within a set of notches 84 of the rail member 62, the tie-down 210 may be subjected to a bending force, e.g., a force applied to the head portion 220 in a direction generally transverse to the axis 218 of the tie-down 210. This bending force may cause the shaft 212 to define a non-normal angle with respect to a longitudinal axis 68 of the rail member 62.

If the foot 230 were fixed relative to the shaft 212, the foot 230 may rotate within the notches 84, possibly causing the foot 230 to slip out of the notches 84. Because the foot 230 may pivot relative to the shaft 212, however, the foot 230 may remain substantially engaged within the notches 84, even if the shaft 212 is pivoted about the foot 230. Thus, the foot 230 may remain fully seated in the notches 84 and substantially secure the tie-down 210 relative to the rail member 62.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A device for securing cargo, comprising:
   a shaft comprising first and second ends defining an axis, an enlarged head portion on the first end of the shaft, and a foot on the second end of the shaft comprising one or more toes extending transversely to the axis;
   a plate slidably mounted to the shaft between the first and second ends, the plate being biased away from the head portion for engaging a portion of a rail between the plate and the foot, the plate being rotatable about the axis relative to the head portion; and
   a cargo securing element on the head portion of the shaft;
   a spacer between the plate and the foot for maintaining a minimal spacing between the plate and the foot;
   wherein the spacer extends from the shaft, and wherein the foot has a width that is no larger than a cross-section of the spacer.

2. A device for securing cargo, comprising:
   a shaft comprising first and second ends defining an axis, an enlarged head portion on the first end of the shaft, and a foot on the second end of the shaft comprising one or more toes extending transversely to the axis;
   a plate slidably mounted to the shaft between the first and second ends, the plate being biased away from the head portion for engaging a portion of a rail between the plate and the foot, the plate being rotatable about the axis relative to the head portion; and
   a cargo securing element on the head portion of the shaft;
   wherein the foot has a "T" shape, thereby defining a pair of opposing toes extending away from one another transversely to the axis; and
   wherein the foot is pivotable about an axis that is transverse to the axis defined by the shaft.

3. A device for securing cargo, comprising:
   a shaft comprising first and second ends defining an axis, an enlarged head portion on the first end of the shaft, and a foot on the second end of the shaft comprising one or more toes extending transversely to the axis;
   a plate slidably mounted to the shaft between the first and second ends, the plate being biased away from the head portion for engaging a portion of a rail between the plate and the foot, the plate being rotatable about the axis relative to the head portion; and
   a cargo securing element on the head portion of the shaft;
   a lock for selectively securing the plate from movement towards the head portion;
   wherein the lock comprises cooperating surfaces on the plate and the head portion that substantially engage one another when the plate is rotated to a predetermined orientation.

4. A device for securing cargo, comprising:
   a shaft comprising first and second ends defining an axis, an enlarged head portion on the first end of the shaft, and a foot on the second end of the shaft having a flat "T" shape, thereby defining a pair of opposing toes extending away from one another transversely to the axis;
   a plate slidably mounted to the shaft between the first and second ends, the plate being biased away from the head portion for engaging a portion of a rail between the plate and the foot, the plate being rotatable about the axis relative to the head portion; and
   a cargo securing element on the head portion of the shaft.

5. The device of claim 4, further comprising a spacer between the plate and the foot for maintaining a minimal spacing between the plate and the foot.

6. The device of claim 1, wherein the foot has an upper surface that is generally convex.

7. The device of claim 4, further comprising a spring element coupled between the plate and the head portion for biasing the plate towards the foot.

8. The device of claim 7, wherein the spring element comprises a compression spring disposed concentrically around the shaft.

9. The device of claim 8, wherein the plate comprises one or more side walls extending towards the head portion of the shaft, thereby defining a cavity for receiving the compression spring therein.

10. The device of claim 4, further comprising a lock for selectively securing the plate from movement towards the head portion.

11. A device for securing cargo, comprising:
    a shaft comprising first and second ends defining an axis, an enlarged head on the first end of the shaft, and a "T" shaped foot on the second end of the shaft;
    a housing slidably mounted to the shaft between the first and second ends, the housing comprising one or more side walls extending towards the head, the sidewalls providing a perimeter defining a cavity;
    a spring disposed within the cavity and coupled between the housing and the head for biasing the housing away from the head for engaging a portion of a rail between the housing and the foot;
    a spacer on the shaft for maintaining a minimal spacing between the housing and the foot; and
    a ring on the head of the shaft.

12. The device of claim 11, wherein the spacer extends from the shaft at a predetermined distance from the foot corresponding to the minimal spacing.

13. The device of claim 11, wherein the foot comprises a transverse member secured to the second end of the shaft, thereby defining a pair of opposing toes extending away from one another transversely to the axis.

14. The device of claim 13, wherein the foot is pivotable about an axis that is transverse to the axis defined by the shaft.

15. The device of claim 11, wherein the spring comprises a compression spring disposed concentrically around the shaft.

16. The device of claim 11, wherein the housing is rotatable relative to the shaft, and wherein the device further comprises cooperating surfaces on the housing and the head that substantially engage one another when the housing is rotated to a predetermined orientation for securing the housing from movement towards the head.

17. A system for securing cargo within a storage space, comprising:
    a rail member comprising a pair of rails defining a slot therebetween extending along a longitudinal axis, the rail member comprising a plurality of notches within the slot and spaced apart along the rail member; and
    a tie-down comprising:
        a shaft including first and second ends defining a transverse axis therebetween, an enlarged head on the first end, a foot on the second end, the foot having a width smaller than a width of the slot such that the foot may be received between the rails when the tie-down is disposed in a first orientation wherein the transverse axis is transverse to the longitudinal axis, the foot having a length larger than the width of the slot such that the foot may be engaged within the notches in the rail member when the tie-down is rotated about the transverse axis to a second orientation;
    a housing slidably mounted to the shaft between the first and second ends, the housing biased away from the head portion for engaging the rails between the foot and the housing for securing the tie-down relative to the rail member when the foot engages notches in the rail member; and
    a cargo securing element on the head portion.

18. The system of claim 17, wherein the rail member comprises a base portion from which the pair of rails extend, and wherein the rail member further comprises flanges extending from ends of the pair of rails towards the base portion.

19. The system of claim 18, wherein the notches are provided in lower edges of the flanges.

20. The system of claim 19, wherein the tie-down further comprising a spacer for maintaining a minimal spacing between the housing and the foot, the minimal spacing being less than a height than the flanges.

21. The system of claim 19, wherein the notches define a pattern of undulations extending along the rail member, and wherein the foot has a shape complementary to the pattern of undulations.

22. The system of claim 21, wherein the notches are rectangular and wherein the foot has a substantially flat upper surface for engaging the notches.

23. The system of claim 21, wherein the foot has a substantially convex upper surface for facilitating the foot being fully received into the notches defined by the pattern of undulations.

24. The system of claim 17, wherein the foot has a "T" shape, thereby defining a pair of opposing toes extending away from one another transversely to the transverse axis.

25. The system of claim 24, wherein the foot is pivotable about an axis that is transverse to the transverse axis.

26. The system of claim 17, further comprising a spring element coupled between the housing and the head portion for biasing the housing towards the foot.

27. The system of claim 26, wherein the housing comprising one or more side walls extending towards the head portion of the shaft, thereby defining a cavity, and wherein the spring element comprises a spring disposed within the cavity and coupled between the housing and the head portion for biasing the housing away from the head portion for engaging a portion of a rail between the housing and the foot.

28. The system of claim 17, further comprising a lock for selectively securing the housing from movement towards the head portion.

29. The system of claim 28, wherein the housing is rotatable about the transverse axis relative to the head portion, and wherein the lock comprises cooperating surfaces on the housing and the head portion that substantially engage one another when the housing is rotated to a predetermined orientation.

30. A method for securing cargo to a vehicle, the vehicle comprising a rail member mounted to a surface of the vehicle, the rail member comprising a pair of rails defining a slot therebetween extending along a longitudinal axis, the rail member comprising a plurality of notches within the slot and spaced apart along the rail member, the method comprising:
    providing a tie-down comprising a shaft including first and second ends defining a transverse axis therebetween, an enlarged head on the first end, a foot on the second end, and a housing slidably mounted to the shaft between the first and second ends, the housing biased away from the head portion;
    inserting the foot of the tie-down into the slot such that the transverse axis is transverse to the longitudinal axis and the foot is oriented substantially parallel to the longitudinal axis;
    rotating the tie-down about the transverse axis until the foot is oriented transversely to the longitudinal axis;
    aligning the foot with a notch within the slot; and
    releasing the tie-down such that the foot is biased to enter the notch and the rails are engaged between the foot and the housing, thereby substantially securing the tie-down relative to the rail member.

31. The method of claim 30, further comprising:
    pushing the head towards the rails for disengaging the foot from the notch;
    sliding the tie-down along the rail member to a new location; and
    releasing the head, whereupon the foot is biased to be received in another notch in the rail member such that the rails are engaged between the foot and the housing, thereby substantially securing the tie-down at the new location.

32. The method of claim 30, further comprising:
    pushing the head towards the rails for disengaging the foot from the notch;
    rotating the head about the transverse axis such that the foot is oriented substantially parallel to the longitudinal axis; and
    removing the foot from within the slot.

33. The method of claim 30, further comprising securing a cargo securing element to the head of the tie-down.

34. The method of claim 33, wherein the head comprises a hook or a ring, wherein the cargo securing element comprises at least one of a hook, a strap, a cable, and a cargo net.

35. The method of claim 30, further comprising:
pushing the head towards the rails for disengaging the foot from the notch;
sliding the tie-down along the rail member to a new location,
releasing the head such that, as the foot approaches the new location, the foot is biased to enter a notch in the rail member at the new location and the rails are engaged between the foot and the housing, thereby substantially securing the tie-down at the new location.

36. The method of claim 30, wherein the rail member comprises a base portion from which the pair of rails extend, wherein the rail member further comprises flanges extending from ends of the pair of rails into the slot towards the base portion, and wherein the notches are provided in the flanges in opposing pairs.

37. The method of claim 36, wherein the inserting step comprises depressing the head portion until the foot is disposed below the flanges.

38. The method of claim 36, wherein aligning the step comprises aligning the foot with an opposing pair of notches, and wherein the releasing step comprises releasing the tie-down such that the foot engages the opposing pair of notches.

39. A method for securing cargo to a vehicle, the storage space comprising a rail member mounted to a surface of the vehicle, the rail member comprising a pair of rails defining a slot therebetween extending along a longitudinal axis, the rail member comprising a plurality of notches within the slot and spaced apart along the rail member, the method comprising:

providing a tie-down comprising a shaft including first and second ends defining a transverse axis therebetween, an enlarged head on the first end, a foot on the second end, and a housing slidably mounted to the shaft between the first and second ends, the housing biased away from the head portion; the foot being engaged with a notch in the slot for securing the tie-down at a first location on the rail member;

pushing the head portion towards the rails for disengaging the foot from the notch;

sliding the tie-down along the rail member to a new location; and releasing the tie-down, whereupon the foot is biased to be automatically received in another notch in the rail member such that the rails are engaged between the foot and the housing, thereby substantially securing the tie-down at the new location.

* * * * *